Oct. 28, 1952     J. ADLER     2,615,270

METHOD OF PRODUCING RANDOM COLOR PATTERNS

Filed March 18, 1950     2 SHEETS—SHEET 1

INVENTOR.
Julius Adler
BY
att'y

Oct. 28, 1952  J. ADLER  2,615,270
METHOD OF PRODUCING RANDOM COLOR PATTERNS
Filed March 18, 1950  2 SHEETS—SHEET 2

INVENTOR.
Julius Adler
BY
*[signature]* Atty

Patented Oct. 28, 1952

2,615,270

UNITED STATES PATENT OFFICE 2,615,270

METHOD OF PRODUCING RANDOM COLOR PATTERNS

Julius Adler, Chicago, Ill.

Application March 18, 1950, Serial No. 150,400

10 Claims. (Cl. 41—19)

The present invention relates to a method and technique for producing ornamental glass or similar transparencies characterized by high-light veining superimposed upon a solid base coloration, preferably in which the opacity of the background color is a function of color density.

This invention concerns itself with a novel production method whereby ordinary glass plate or similar transparencies are ornamented by the practice of a comparatively simple manual technique and results in the production of a decorative effect comprising multiple light striation or color variegation which add to a black or dark pigmented base color a richness in scintillating reflective and sparkling veining embellishments of pattern irregularity akin to night reflection of celestial bodies and striations of light in motion.

When produced in accordance with a preferred practice, as described herein, this ornamentation reveals tinsel-like high-lighting resembling lustrous silk threaded velvet or velour. In other examples there may be produced a sensation of astral streaking that has proved itself to be particularly enhancing as frame trim on picture molding or on kindred applications where the surrounding effect of this composite contributes a sensation of celestial surrounding indefinite space projection.

Various glyptic or carving techniques may be employed which will finally produce a variety of different illusory effects in addition to the example specifically discussed and illustrated. Of significance is the fact that although numerous varied glytic techniques may be directed towards the attainment of a wide miscellany of impressionistic art effects, none of the operations involved necessitates a high degree of skill or dexterity for success. Instead, the glyptic stroking and sculpturing variations reflecting individuality of expression create pattern themes which differ in composition but which have characteristic beauty independent of pattern or color harmony.

For a better understanding of the present invention and for a more detailed explanation of the practices under which it may variously be achieved, reference will now be had to the following specification and to the accompanying drawings in which like reference characters designate corresponding parts throughout and in which.

Figure 1:
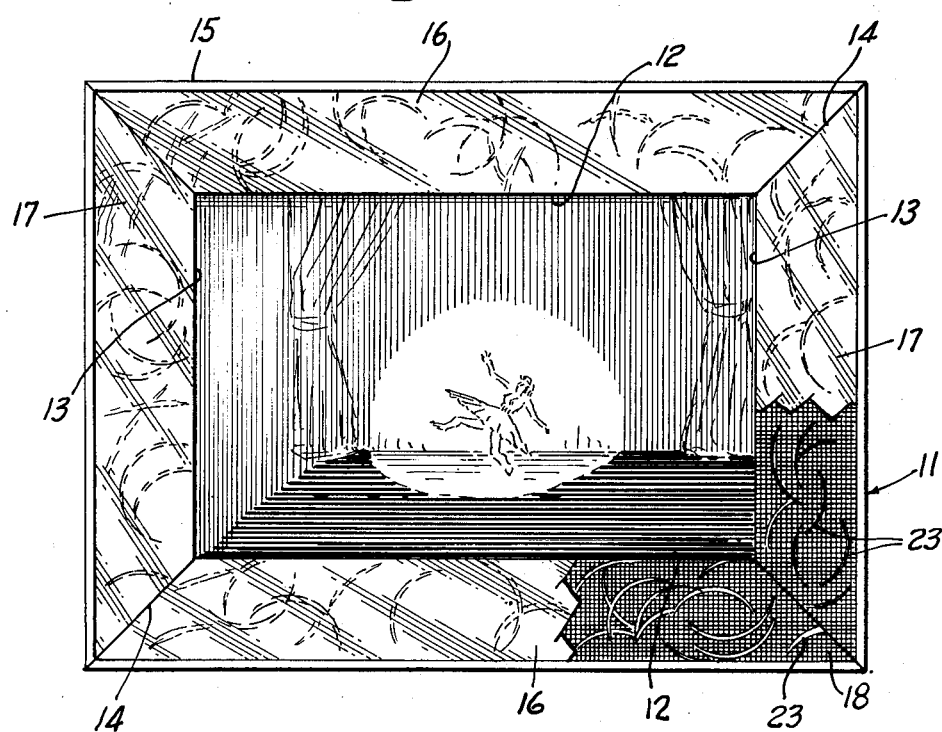
Fig. 1 is a front elevational view of a picture and frame mounting with portions broken out in which has been incorporated a molding overlay prepared in accordance with the present invention.
Figure 5:
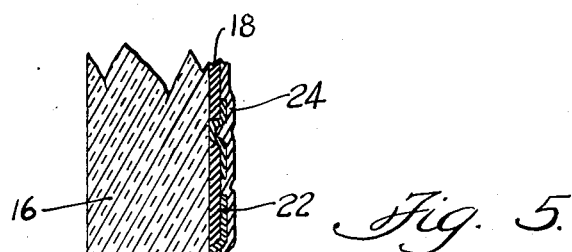
Figure 2:
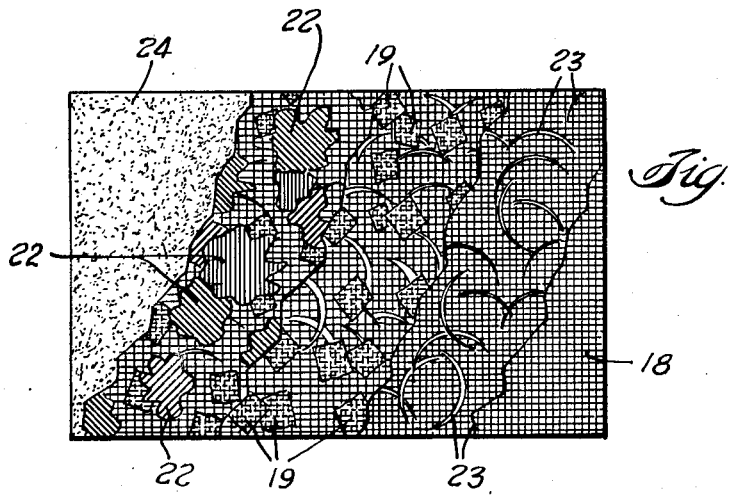
Fig. 2 is a plan view of a plate of glass or other transparency shown with its prepared surface foremost and broken away in successive layers to illustrate the various steps of treatment in accordance with the present invention.
Figure 3:
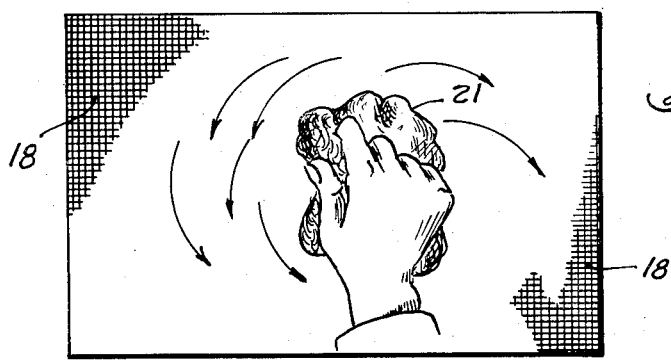
Figure 4:
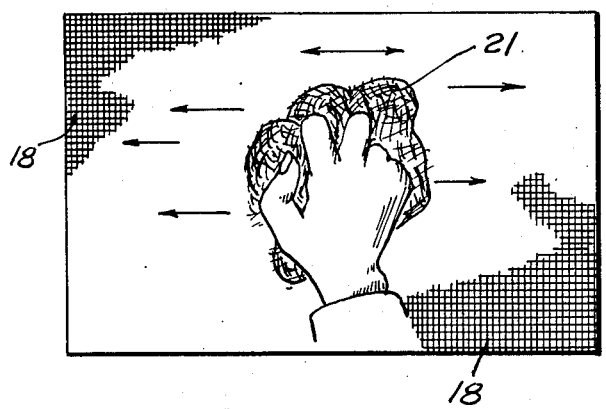

Figs. 3 and 4 are elevational views similar to Fig. 2 illustrating manual techniques of glytic streaking or carving such as may be accomplished by the use of mineral wool, chip clusters or similar materials; and Fig. 5 is an enlarged cross sectional detail view through a fragment of glass or other transparency illustrating by accentuated proportions the successive surface deposits which are applied after the methods of the present invention.

The thickness of the glass or other transparency upon which the decorative effect of the present invention are applied, is not critical and may be selected to suit the circumstances or uses. Thus, as overlay for picture molding, commercial single strength panel glass is suitable and adequate, affording the advantages of economy and ease of cutting and handling. For the production of wall tile, wainscoting and for covering large wall areas, heavier glass is preferable although when applied to sheet plastics or formed objects, the thinness of the stock constitutes no deterrent since the application techniques, as will hereinafter be explained, involve only gentle applications of force throughout the entire successive steps of the process.

In the accompanying illustrations, the reference numeral 11 designates generally a picture frame constructed of mitered molding sections 12 and 13 in which the mitered cuts 14 may be regular and perpendicular to the panel surface, or on an angular displacement therefrom so that the molding components, when brought together, will meet along a pyramidal or inwardly receding miter joint after the manner known in picture frame constructions. The stock of which the molding is made is preferred to have a flat surface and a relatively wide facing. The inner and outer perimeters of this stack may, if preferred, be embellished by having relief beading 15 or lip filleting, although it is to be observed that the excellence of the produced artistic effects of the present inventive ornamentation is self-sufficient and not dependent on any supplementary qualities of the molding. The picture frame may be assembled in the already described manner, after which the overlay panels 16 and 17 may be applied by gluing, cementing, or otherwise securing to the surface of the molding frame.

The herein disclosed process may be applied upon narrow picture frame widths of glass or upon wide stock and then cut to framed dimensions in conventional glass marking and breaking techniques.

In producing the desired results, a sheet of glass stock is laid horizontally upon a work bed where it may obtain throughout total surface support. A base color 18 for producing the celestial space effect should preferably be one in the darker ranges of black or brown, such as is characteristic of coal-tar, pitch, or commercial asphalt. Most distillation residues of this class are quite suitable for the purpose and the low cost of these hydrocarbon compounds makes them economically attractive as well as physically suitable since they possess a skin forming characteristic which arrests internal drying and oxidation, and because they are adhesive to all types of surfaces and residually tacky whereby metal foil 19 and tinsel are securely retainable.

In selecting alternatives for a base color 18, it should be a primary consideration that a substance possess a low viscosity or plasticity akin to that of roofing tar at room temperature so that when the hereinafter described sculpturing, carving or low relief glyptic operations, Fig. 3 or 4, are performed, the removed lineations remain sharp in outline. After the application of a coating of asphalt or other opaque color plastic, either by trowelling, daubing or brushing from a liquid or plastic stock, it is desirable that the surface be seasoned for several hours or until a tacky firmness becomes manifest in the asphalt layer and after a distinct skin effect has been produced by drying.

The plate or sheet may then be supported upon an inclined work board or, if preferred, it may remain in a prone position when the secondary operation is performed which consists of stroking the background color layer 18 with a shavings cluster material 21, preferably of metallic hardness such as drilling chips, steel wool or an artist's fitch. This stroking is critical among the application techniques herein involved, because its variations determine in a general sense the theme or style of the effects. Circular and undulating pressure motions as shown in Fig. 3 will remove arcuate strips or scrapings 23 of the plastic base color 18 in tapering widths and in random displacements. To and fro stroking will produce straight line glyph marks with or without intersection. Practice and preference will indicate the density or concentration with which this technique is to be worked and experience will direct variations in the manual technique of the performance. Engravings may intersect one another and others will form concentrations and attenuations in parallelism with one another. These strokings may be angled variations of straight lines, Fig. 4, parallel or intersecting movements producing still different effects. When a desired extent of sculpturing 23 is produced, the surface is then in readiness for color treatment.

For this portion of the process, the plate is preferably disposed in a horizontal position and the first applications are those of random overlays of metal foil 19. Sheet fragments of thinly beaten lusterful metals such as aluminum, copper, brass, silver or gold may be dropped onto the prepared surface so that the residual tackiness will produce instantaneous adherence randomwise with some exposed glyptic surfaces 23 receiving flat areas of the metallic film 19 and others compacting film crinkles. The major portion of the glyptic area should, in this way, be covered, after which an underlying light may be employed to expose the glyptic area extent which remains uncovered by metallic film.

The next operation is that of fluid color spotting and for this purpose, the operator, using a daub brush or other soft applicator, may superimpose color blotches 22 of lacquer colors or enamels which should cover not only the unexposed area of the glyptic engravings, but also may be permitted to permeate between the crinkled metallic coverings. This treatment will later be observed to produce minute cracks of stratifications within the crinkled metallic areas, simulating metallic or mineral oxidation in the minute significances. When the color spotting has been completed, the overall area may be covered with a protective enamel 24, shellacked or varnished for preservation.

When glass is used in stock sheets, scoring for cutting or glass breaking purposes is preferably done on the untreated area of the glass and parted by splitting after the manner well known in glass cutting practice. After the tailored panels are installed, which is performed by placing the treated areas innermost, there is exposed to view the untreated glass surface through which may be observed the dominant dark background color variously flecked with lustrous and colorful striations or glyph streakings.

Where the glyph strokes leave shallow thicknesses of the ground color, there may be observed area characterized by different degrees of color intensity. These variations can be observed to be additionally attractive because where the ground color pigmentation is a function of the density of the deposit, minute facet effects resembling cut jewels will gleam under different light angle reflections.

While the present invention has been explained and described with reference to a preferred and proved method of practice and accomplishment, it will be understood, nevertheless, that changes and variations are susceptible of being incorporated without departing from the essential spirit or scope thereof. Accordingly, it is not intended to be limited for an understanding of this invention to the precise language employed in the foregoing description nor to the disclosure in the accompanying drawings except as indicated in the hereunto appended claims.

The invention claimed is:

1. The method of ornamenting a transparency comprising covering one surface of the transparency with a plastic ground coat, drying said ground coat to form a tacky skin surface, removing portions of said ground coat to expose localized areas of said transparency, covering at least some of said exposed areas with metal foil carrying a coating contrasting in color with the color of the ground coat, and thereafter applying a protective coating to the overall area of the decorated transparency.

2. The method defined in claim 1 in which the colored metal foil is provided by first applying the metal foil to the exposed areas and then coating the metal foil with the contrasting coating.

3. The method defined in claim 2 in which some of the unexposed areas are spotted with a color coating contrasting in color with the color of the ground coat.

4. The method defined in claim 2 in which the color coating comprises a plurality of contrasting colors.

5. The method defined in claim 1 in which some of the unexposed areas have metal foil applied thereto.

6. The method defined in claim 1 in which some of the unexposed areas have metal foil applied thereto and said metal foil and areas free of said metal foil are spotted with a color coating contrasting in color with the color of the ground coat.

7. The method defined in claim 1 in which the ground coating is a hydrocarbon coating.

8. The method defined in claim 1 in which the ground coat is selected from the group of materials consisting of pitch, coal tar, and commercial asphalt.

9. The method of ornamenting a transparency comprising covering one surface of the transparency with a plastic ground coat, drying said ground coat to form a tacky skin surface, removing portions of said ground coat to expose localized areas of said transparency, flecking in haphazard fashion portions of said ground coat and portions of the exposed areas with metallic foil, spotting portions of the overall area of the so-treated transparency with a color coating contrasting in color with the color of the ground coat, and thereafter applying a protective coating to the overall area of the decorated transparency.

10. The method defined in claim 1 in which the portions of the ground coat are removed by glyphing.

JULIUS ADLER.

REFERENCES CITED

The following references are of record in the file of this patent:

UNITED STATES PATENTS

| Number | Name | Date |
|---|---|---|
| 185,013 | Bleiss | Dec. 5, 1876 |
| 1,224,328 | Scritsmier | May 1, 1917 |
| 1,586,727 | Wurf | June 1, 1926 |
| 1,608,281 | Weber | Nov. 23, 1926 |
| 1,924,787 | Hill | Aug. 29, 1933 |
| 2,047,583 | Hansen | July 14, 1936 |
| 2,085,875 | Sirovy | July 6, 1937 |
| 2,174,899 | Selsky | Oct. 3, 1939 |
| 2,453,441 | La Fair | Nov. 9, 1948 |